Oct. 6, 1970
A. C. KRUGER, JR., ETAL
MOVING OBJECT DETECTOR USING DIFFERENTIALLY COMBINED OPTICAL SENSORS HAVING INTERSECTING AXES
Filed Nov. 27, 1967
3,532,886
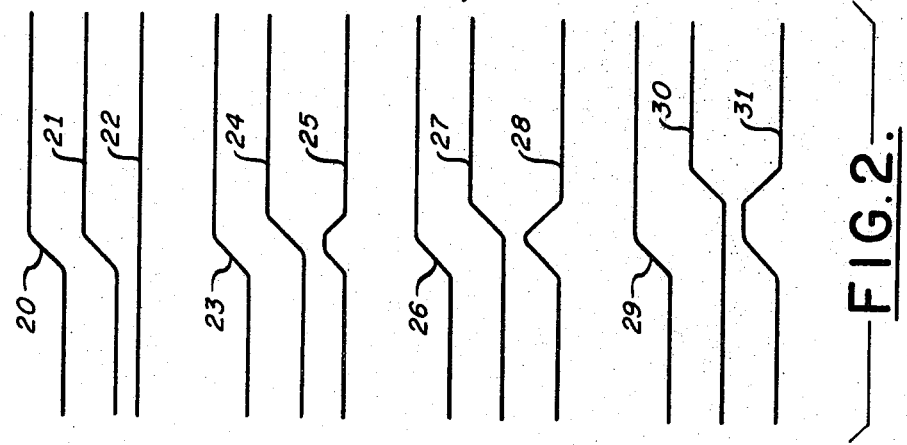
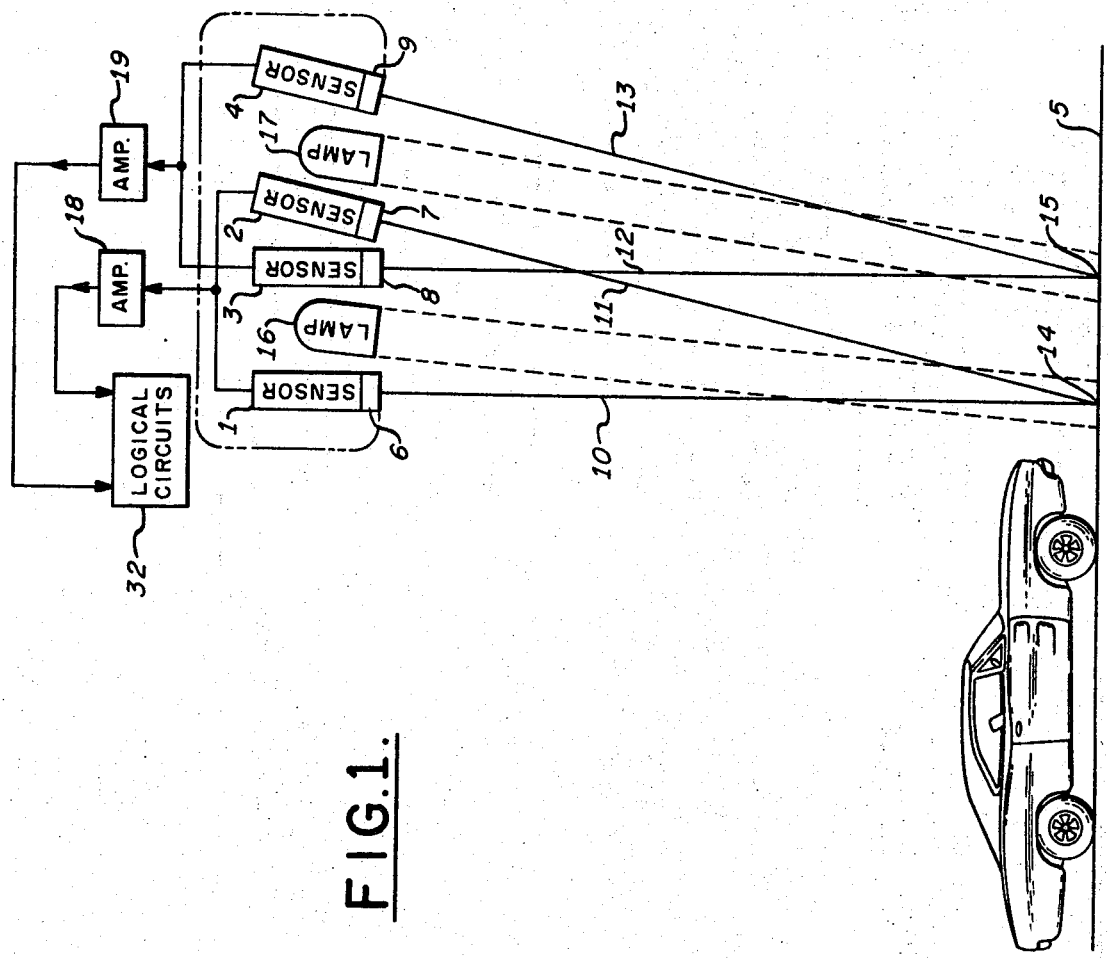
INVENTORS
ARTHUR C. KRUGER JR.
JOSEPH T. SHEPPERS JR.
HARRY F. STRENGLEIN
BY
ATTORNEY

United States Patent Office 3,532,886
Patented Oct. 6, 1970

3,532,886
MOVING OBJECT DETECTOR USING DIFFERENTIALLY COMBINED OPTICAL SENSORS HAVING INTERSECTING AXES
Arthur C. Kruger, Jr., Joseph T. Sheppers, Jr., and Harry F. Strenglein, Clearwater, Fla., assignors to Sperry Rand Corporation, a corporation of Delaware
Filed Nov. 27, 1967, Ser. No. 685,868
Int. Cl. G08g 1/01
U.S. Cl. 250—83.3    8 Claims

ABSTRACT OF THE DISCLOSURE

A detector for sensing the velocity of an object moving along a path at least a minimum distance above a predetermined plane. The detector comprises two optical sensors having converging axes of sensitivity which meet at said predetermined plane. The outputs of the sensors are differentially combined to produce a first output signal only in the event that an object traverses said axes along said path. A second detector displaced a known distance along the line of object travel provides a delayed but otherwise similar output signal which is processed with the first output signal in logical circuits to provide a signal representing object speed.

BACKGROUND OF THE INVENTION

Automatic traffic control systems have been proposed to solve the ever increasing traffic problem in urban communities. No control system, however, can be more effective than the vehicle sensing device which is the source of the input traffic data upon which the necessary traffic control computations depend. One of the preferred vehicle sensing techniques employs a pair of sensors displaced from each other a known distance along the line of travel of the vehicles to be detected. The time separation between the output signals produced by the sensors as the vehicle enters and subsequently emerges from the detection zone defined by the sensors provides a measure of vehicle speed. A system of this general character is disclosed in U.S. Pat. No. 3,314,065, issued Apr. 11, 1967 to O. I. Steigerwalt et al. and assigned to the present assignee.

The system disclosed in the aforementioned patent utilizes a transmitter disposed between a pair of receivers suspended above the line of vehicular travel. Microwave radiation from the transmitter irradiates the road and all vehicles travelling thereon over a predetermined region. Microwave echoes returned to the displaced pair of receivers are detected and processed by logical circuits to provide a signal representing the speed of each vehicle which travels through the zone of detection defined by the transmitter and receiver beam geometry.

One microwave echo signal is received by the upstream receiver as a vehicle enters the zone of detection and a second microwave echo is received by the downstream receiver as the vehicle emerges from said zone. The time separation between the two microwave echoes is a measure of vehicle speed. It has been found, however, that undesirable multi-path interference effects can occur particularly at conventional radar transmission frequencies which cause the microwave echo signals to be poorly defined and, hence, difficult to detect with high precision as to the times of their initiation. As a consequence, error can arise in the determination of the elapsed time between the initiations of the successive microwave echo signals received by the two displaced receivers.

SUMMARY OF THE INVENTION

The present invention completely avoids the problem of multi-path interference effects by the use of optical frequency detection means rather than radar frequency detection means. A substitution of optical detectors for radar detectors introduces a new problem, however, in that the optical detectors respond to variations in reflected light intensity not necessarily attributable to the presence of a moving vehicle. For example, optical detectors respond to shadows of moving objects such as those cast onto a traffic lane under surveillance by the motion of vehicles in another traffic lane. Provision is made in the present invention for the elimination of response to light intensity variations not attributable to the presence of a moving vehicle in the traffic lane under surveillance. This is achieved through the use of optical systems for establishing two fields of view for respective optical detectors along two convergent axes which meet at the road surface. The increasing displacement of the axes as a function of height above the road surface permits a vehicle having at least a minimum height to traverse the axes at different times. The result is that one sensor associated with one axis produces an output signal at a time different from that of a second sensor associated with the second axis. Moving shadows, on the other hand, occur on the road surface and cause simultaneous and equal output signals from the sensors. Thus, when the sensor output signals are differentially combined, only a moving vehicle produces a resultant output signal.

BRIEF DESCRIPTION OF THE DRAWINGS

FIG. 1 is a simplified block diagram of a preferred embodiment of the invention; and FIG. 2 is a series of idealized waveforms produced by the apparatus of FIG. 1 under various conditions.

DESCRIPTION OF THE PREFERRED EMBODIMENT

Referring to FIG. 1, the present invention comprises an upstream pair of sensors 1 and 2 and a downstream pair of sensors 3 and 4. The terms "upstream" and "downstream" are referenced to the direction of vehicular movement along road 5, the upstream sensors being encountered first by moving vehicles. Optical systems 6, 7, 8 and 9 are provided for sensors 1, 2, 3 and 4, respectively, to form focussed fields of view along axes 10, 11, 12 and 13. Axes 10 and 11 converge at point 14 along road 5 whereas axes 12 and 13 converge at point 15. In a typical installation, by way of example, the sensors are located approximately 18 feet above the road 5, sensors 1 and 2 are displaced by 18.5" from each other along the line of traffic and sensors 2 and 4 are similarly displaced. Optical systems 6–9 focus the fields of views of the sensors 1–4 so that the superimposed fields at points 14 and 15 are about 2" in diameter and are displaced from each other by about 15". In the event that sensor operation is required at night where insufficient ambient light conditions are encountered, it becomes necessary to provide lamps 16 and 17 for illuminating points 14 and 15 on road 5. Preferably non-visible light is used for night operations in order to avoid objectionable reflections from the hoods of automobiles passing beneath the lamps which might startle or otherwise distract the drivers.

The outputs of sensors 1 and 2 are differentially combined and applied to amplifier 18 and the outputs from sensors 3 and 4 are differentially combined and applied to amplifier 19. Amplifier 18 produces an output pulse each time a vehicle traverses the position of axes 10 and 11 assuming that the vehicle has a height in excess of a predetermined minimum amount to be discussed later. Similarly, amplifier 19 provides an output signal each time that a vehicle traverse the positions of axes 12 and 13 assuming again that the vehicle meets the minimum height requirement. The pulses at the outputs of amplifiers 18 and 19 correspond to the detected upstream and downstream signals at the output 24 of video amplifier 22 of the aforementioned patent and are processed in logical circuits 32 in the manner of the aforementioned patent to yield a measure of the velocity of the vehicle being detected. Logical circuits 32 determine the elapsed time between the pulses at the outputs of amplifiers 18 and 19.

Sensors 1 and 2 preferably comprise respective photosensitive resistors. A differential output conveniently may be obtained by connecting the resistors in series circuit across a suitable power supply and deriving the output at the junction of the resistors. With such a connection, no output signal will be produced by matched photosensitive resistors upon fluctuations in the power supply or upon any other changes which simultaneously and equally affect the intensity of the light falling upon the two photosensitive resistors including, for example, shadows which pass through the posoition of point 14 on road 5 of FIG. 1. More particularly, it the amplfer into which the series connected photosensitive resistors operate has an input impedance high compared to the resistors and if resistors are of the type whose resistance is inversely proportional to illumination (normally true for cadmium sulfide and cadmium selenide photocells), then the output votage resulting from a change in the reflectivity of the surface viewed by one photocell is nearly independent of the common light intensity over fairly wide ranges of intensity. This property greatly simplifies the design of the following logical circuits. This action is limited by the dark current of the photocells and finite amplifier impedance at low light levels and departure from linearity at high levels.

FIG. 2 is a series of idealized waveforms produced at the outputs of sensors 1 and 2 and at the output of amplifier 18 for objects of varying heights moving along road 5. Said waveforms are based upon the typical system geometry previously discussed and shown in FIG. 1. Waveforms 20 and 21 are produced at the outputs of sensors 1 and 2, respectively, in the case where a very small object passes through point 14 on road 5. Inasmuch as the fields of view of sensors 1 and 2 substantially coincide on the plane of road 5, simultaneous and equal changes occur in the amplitude of the light impinging upon sensors 1 and 2. Accordingly, no change takes place in the amplitude of the signal at the output of amplifier 18 as represented by waveform 22. Assuming now that an object having a height of about 1¼ feet traverses the position of point 14, waveforms 23 and 24 are produced at the outputs of sensors 1 and 2, respectively. The differential signal represented by waveform 25 is produced at the output of amplifier 18. In the event that an object having a height of about 2½ feet passes over point 14, waveforms 26 and 27 appear at the outputs of sensors 1 and 2 while waveform 28 appears at the output of amplifier 18. It should be observed that the amplitude of waveform 28 is twice that of waveform 25 whereby the sensitivity of the detection system is improved two-fold (on an amplitude basis) for objects having a height of about 2½ feet relative to objects having 1¼ feet. Waveforms 29 and 30 occur at the outputs of sensors 1 and 2, respectively, and waveform 31 is provided by amplifier 18 when an object having a height of about 5 feet passes over point 14 of road 5. It can be observed that the amplitude of output waveform 31 is no greater than the amplitude of waveform 28 although the duration of the former exceeds that of the latter. Thus, maximum sensitivity (on an amplitude basis) of the moving object detector of the present invention is achieved when the height of the object passing along road 5 equals or exceeds about 2½ feet. Said sensitivity gradually diminishes and becomes substantially zero in the instance of reflectivity changes occurring substantially at the plane of road 5 as is the case of shadows moving along road 5.

It should be understood that the sensitivity of the present moving object detector is not affected by the angle which any one of the axes 10, 11, 12 and 13 makes with road 5. Sensitivity is a function of the angle between axes 10 and 11 and the angle between axes 12 and 13. Accordingly, it is not necessary that any axis be perpendicular to road 5 as is shown in the case of axes 10 and 12 in the disclosed embodiment.

Being mindful of the fact that the moving object detector of the present invention responds basically to sequential variations in the intensity of the light falling upon sensor pair 1 and 2 and upon sensor pair 3 and 4 rather than upon the cause of such light intensity variations, it will be recognized by those skilled in the art that the detector may be employed in diverse applications unrelated to traffic control system applications.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A detector for sensing an object moving along a path at least a minimum distance above a predetermined plane, said detector comprising:
   first and second optical sensors having converging axes of sensitivity,
   said axes meeting at a first location on said plane,
   each said sensor providing a signal having an amplitude representing the intensity of light impinging thereon, and
   means for differentially combining the signals from said sensors to provide a first output signal.

2. A detector as defined in claim 1 and further including: a lamp for illuminating said plane where said axes meet.

3. A detector as defined in claim 2 wherein said lamp emits non-visible radiation.

4. A detector as defined in claim 1 and further including:
   optical systems for said first and second sensors to form superimposed fields of view where said axes meet.

5. A detector as defined in claim 1 and further including:
   third and fourth optical sensors having converging axes of sensitivity meeting at a second location on said plane,
   each said third and fourth sensor providing a signal having an amplitude representing the intensity of light impinging thereon, and
   means for differentially combining the signals from said third and fourth sensors to provide a second output signal.

6. A detector as defined in claim 5 and further including:
   logical circuit means connected to receive said first and second output signals to determine the elapsed time between the occurrences of said first and second output signals whereby an indication of the velocity of said moving object is provided.

7. A detector as defined in claim 5 and further including:
a first lamp for illuminating said plane where the axes of said first and second sensors meet, and
a second lamp for illuminating said plane where the axes of said third and fourth sensors meet.

8. A detector as defined in claim 7 wherein said first and second lamps each emit non-visible radiation.

References Cited

UNITED STATES PATENTS

| | | | |
|---|---|---|---|
| 2,446,628 | 8/1948 | Brown | 250—223 |
| 2,918,581 | 12/1959 | Willey et al. | |
| 3,056,106 | 9/1962 | Hendricks. | |
| 3,233,084 | 2/1966 | Kendall et al. | |
| 3,436,540 | 4/1969 | Lamorlette. | |

ARCHIE R. BORCHELT, Primary Examiner

U.S. Cl. X.R.

250—222; 340—38